United States Patent [19]

Wood

[11] 4,366,012

[45] Dec. 28, 1982

[54] IMPREGNATION PROCESS

[75] Inventor: Eric Wood, Ossett, England

[73] Assignee: Insituform International Inc., Great Britain

[21] Appl. No.: 231,690

[22] Filed: Feb. 5, 1981

[51] Int. Cl.³ .......................... B05D 7/22; B32B 1/08
[52] U.S. Cl. ..................................... 156/93; 156/287; 427/238
[58] Field of Search ................ 427/238, 294; 156/287, 156/93

[56] References Cited

U.S. PATENT DOCUMENTS 4,182,262  1/1980  Everson et al. ................ 427/238 X Primary Examiner—James R. Hoffman
Attorney, Agent, or Firm—Louis Orenbuch

[57] ABSTRACT

A method of impregnating the inner absorbent layer of a long flexible tube with a curable resin is begun by introducing a mass of the resin into one end of the tube. A window is formed in the impermeable outer layer of the tube at a distance from the resin mass. A vacuum in the interior of the tube is drawn through the window and concurrently the resin mass is pushed toward the evacuated region by passing the tube between a pair of squeezing members. When the flowing resin reaches the vicinity of the window, the window is sealed. Another window is formed in the tube farther downstream of the previously formed window. A vacuum is drawn through the new window while the squeezing members force the resin to flow toward the newly evacuated region. The procedure is repeated until the resin has spread through the entire inner absorbent layer of the tube.

3 Claims, 12 Drawing Figures

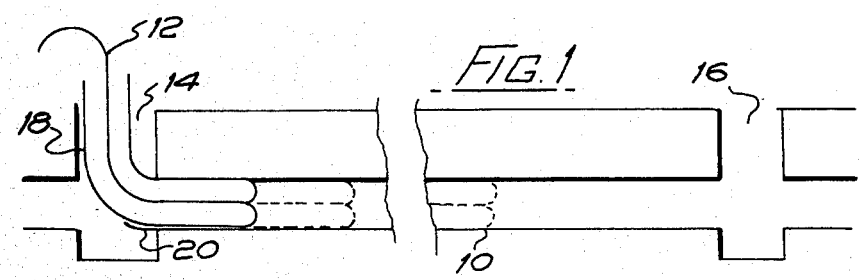
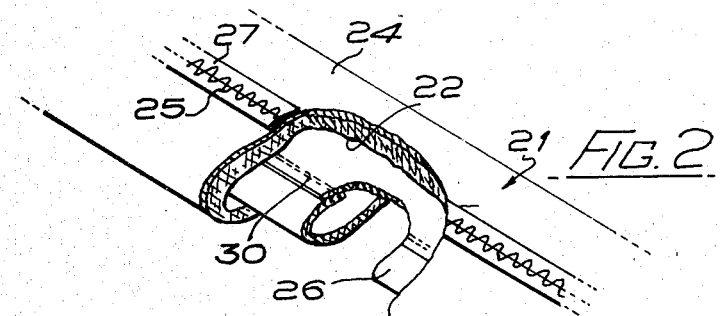
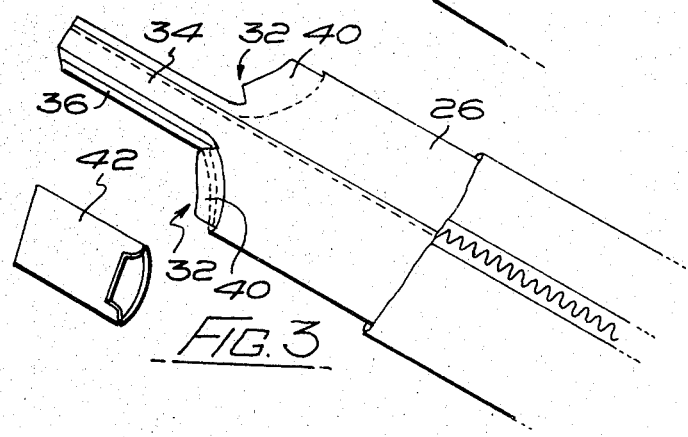
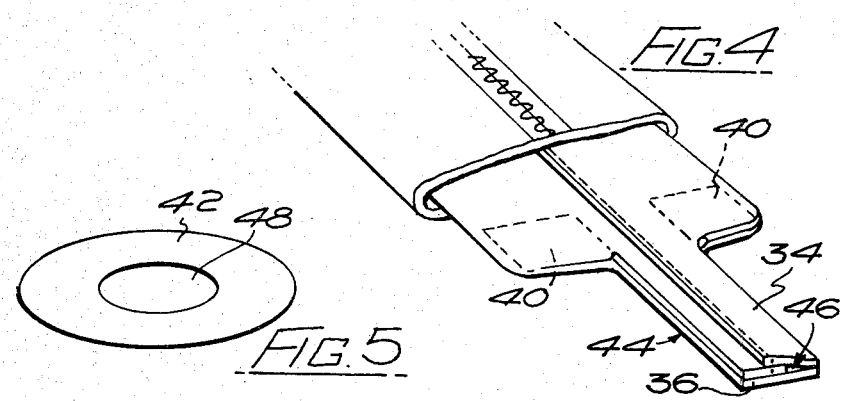
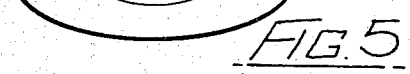

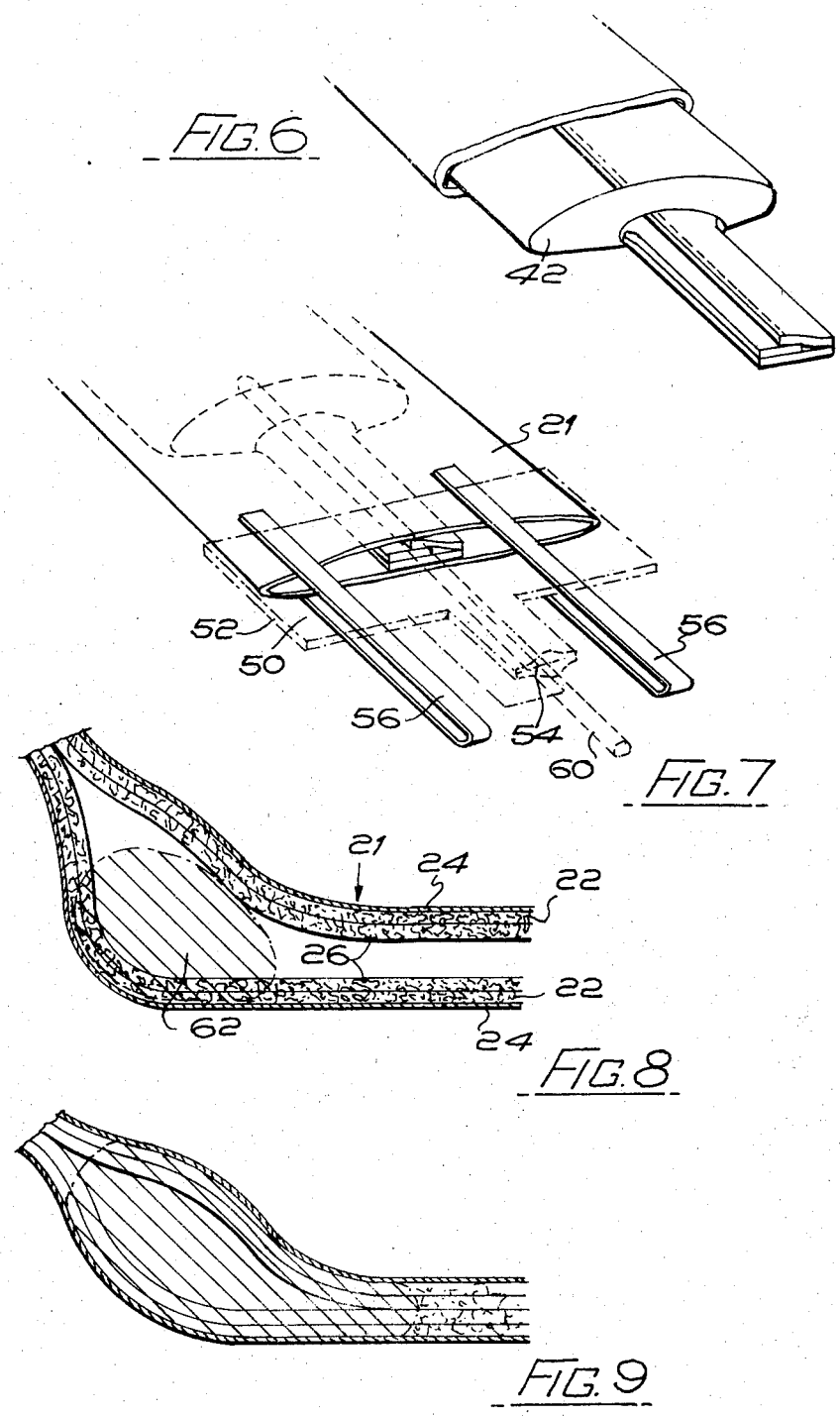

IMPREGNATION PROCESS

This invention relates to a process for the impregnation of a flexible lining tube comprising or including resin absorbent material, for the even and homogeneous impregnation of the absorbent material with a resin composition.

In recent years, we have developed what is now known in a large number of countries as the "INSITUFORM" (trade mark) lining process for the lining of pipelines and passageways. This process is particularly suitable for the rehabilitation of underground pipelines and passageways which have fallen into a state of disrepair, or are faulty, and a particularly good application for the INSITUFORM process is the lining of underground sewer pipelines and passageways which may be suffering from egress or ingress of water.

The INSITUFORM lining process comprises basically the inversion into the pipeline or passageway to be lined of a tubular flexible liner which includes a resin absorbent material impregnated with curable resin. The flexible liner is held against the surface to be lined by means of fluid pressure, and the resin allowed or caused to cure, so that there is formed a hard resin lining against the passageway or pipeline surface, such lining being free standing and including, embedded therein, the resin absorbent material.

The resin absorbent material performs two functions in that it provides increased impact strength in the final lining as it is totally immersed in the hardened resin, and it also serves the purpose of keeping the resin, when in fluent state, evenly distributed circumferentially of the flexible lining tube until and after the tube is placed in position lining the pipeline or passageway.

The resin absorbent material, which typically may be a resin absorbent felt material currently forms an important element in the INSITUFORM lining process, and it is important that the resin absorbent material be evenly soaked with and impregnated in the resin for the formation of an even thickness lining in the pipeline or passageway. It is important during the impregnation process that air be excluded from the resin absorbent material to the maximum possible extent, and the present invention is concerned with the effective impregnation of the resin absorbent material of a flexible lining tube for use especially, but not exclusively in the INSITUFORM lining process described above.

In the INSITUFORM lining process, the flexible tube is also provided with an outer impermeable membrane, which serves two purposes, the first being to retain the wet resin when the resin absorbent material is first impregnated, and secondly to permit the eversion of the impregnated lining tube into the pipeline or passageway using a fluid, usually water. When water is so used, it acts on the surface of the lining tube defined by the membrane so as to force the tube to turn inside out in the passageway, and of course the water is kept out of contact with the resin by the membrane.

In the method of the present invention, use is made of the outer impermeable coating, which may be in the form of a loose tubular film, or a coating bonded to a layer of resin absorbent material, for the effective and even impregnation of the resin absorbent material.

The INSITUFORM lining process is used for the lining of pipelines or passageways of considerable length e.g. of the order of 100 to 300 meters without a joint in the lining material tube, and therefore the impregnation of the tube is of critical importance.

Additionally, the design and structure of the tube for the effective insertion is also important, and this invention provides specific constructional forms of tube for the INSITUFORM lining process.

In accordance with a first aspect of the invention, a flexible tube comprising an inner layer of resin absorbent material, and an outer layer in the form of an impermeable film, has the resin absorbent layer impregnated with a curable resin by applying a vacuum to the inside of the flexible tube whilst the resin is brought into impregnation contact with the resin absorbent material, the impermeable film serving as a means to prevent ingress of air into the interior of the tube whilst the impregnation process is taking place.

Preferably, the resin is introduced into one end of the tube in a quantity calculated effectively to impregnate all of the resin absorbent material of the tube, and the vacuum is applied to the interior of the tube, downstream of the resin mass, so that the resin will tend to flow towards the vacuum application region.

Preferably, the lining tube containing the mass of resin is fed through a pressure applying nip, such as may be defined by a nip roller, which, together with the movement of the tube, squeezes the resin in a direction towards the region of application of the vacuum, at the same time flattening the tube and assisting in the even distribution of the resin.

The vacuum may be applied through a window in the film in the wall of the tube by means of a cup applied to said window and connected to a source of vacuum by means of a flexible hose, whereby the cup can move with the tube during its movement relative to said nip. As each section of the tube has its resin absorbent material thus impregnated with resin, the cup may be moved and applied to a position spaced downstream from the previous window, the said previous window being sealed by means of a patch or the like, whereby the process is repeated for respective lengths of the tube until the entire tube length has been impregnated.

In order to form an initial air seal at the end of the lining tube into which the resin is introduced, an initial slug of resin may be introduced into said end, the end subsequently closed, and a vacuum applied to the interior of the tube downstream of the slug of resin, whereby there will be an initial impregnation of the resin absorbent material at the said end at which the resin is introduced, to prevent air from being drawn in at said end during the subsequent impregnation steps as above described.

The lining tube may comprise an outer layer defined by a felt coated with synthetic resinous material to form said film, such outer layer being formed into a tube and having the adjacent edges sewn together, and then covered by a sealing strip or the like, the one or more inner layers of resin absorbent felt formed into tubes with their adjacent edges sewn together.

With such construction, it is possible to construct an extremely advantageous end of tube assembly, to make the tube particularly suitable for the INSITUFORM lining process. In such assembly, the inner layer has shoulders cut therein, and the edges of the cut portions are bonded together to define a central vent tube. A portion of the cut away felt is used to define a strengthening saddle portion having a central aperture through which the vent tube passes, and the said saddle portion being seated on the formed shoulders. Where appropriate, the contacting surfaces of the felt are flame bonded together. The outer layer extends over the vent tube, but does not seal same. The end of the outer tube is sealed apart from a bleed outlet, by means of flexible impermeable material such as polyurethane film. The bleed outlet is in line with the vent tube to facilitate the charging of the resin into the end of the tube through the bleed outlet and vent tube.

Such an assembly enables the ready insertion of the resin into the end of the tube, and also permits the tube subsequently to be closed, for example during the application of vacuum for the effective impregnation process.

Finally, the said tube end may be provided with straps bonded to the outer surface of the outer layer and forming U-shaped loops for the holding back of the tube during the insertion process, the said end being the end which is last introduced into the pipeline to be lined, as will be clear from the description which is given herein.

The resin which is used for the impregnation of the absorbent material, typically may be polyester or epoxy resin, but it is not intended that the invention should be limited to the use of such materials. Furthermore, the resins may or may not include fillers, such as olive stone or waste particulate materials from power stations.

Although the resin absorbent material of the lining tube is normally felt in the INSITUFORM lining process, the invention is not to be taken as being limited to the use of this material. Woven and knitted materials, or flexible foams could be used, either singly or in combination and in combination with felt materials.

For a more detailed explanation of aspects of the present invention reference is now made to the accompanying drawings, wherein:

FIG. 1 illustrates diagrammatically the basic INSITUFORM lining process;

FIG. 2 illustrates in perspective, cut away elevation, a section of a typical lining tube used in the INSITUFORM lining process;

FIGS. 3 to 7 illustrate in perspective elevation, the steps involved in the construction of the end of the lining tube through which the resin is inserted;

FIG. 8 illustrates in sectional elevation how a slug of resin is introduced into one end of the lining tube for the initial sealing of same;

FIG. 9 illustrates how the slug of resin seals the end of the tube when a vacuum is applied thereto;

FIG. 11 illustrates in enlarged sectional view how the vacuum is applied to the interior of the tube during the lining process illustrated in FIGS. 9 and 10.

Figure 10:
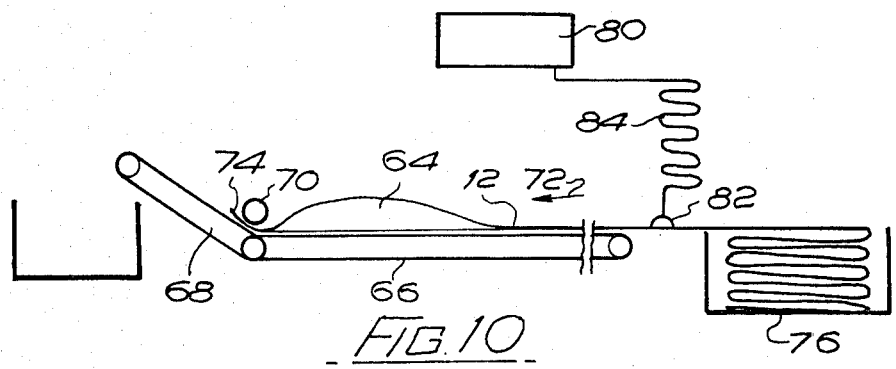
FIGS. 10 and 11 illustrate in diagrammatic sectional elevation the process of impregnating the absorbent material of all of the lining tube.

Referring to the drawings, in FIG. 1 there is shown the basic arrangement of the INSITUFORM lining process.

An underground pipe 10 is to be lined by means of a tubular lining 12 (see FIG. 2). There are manholes 14 and 16 at the ends of the particular length of pipeline 10 being lined, and a down feed tube 18 is placed in one of the manholes 12, so that an elbow at the bottom of the tube 18 faces and is in register with the end of the pipeline section 10. The lining tube 12 has one end 20 passed down the pipe 18, folded back and anchored to the end of the elbow as shown in FIG. 1. The down feed pipe 18 is filled with water which forces the lining tube 12 to evert into and along the pipeline section 10, as shown at various stages by the dotted lines in FIG. 1. The lining tube 12 is therefore forced against and moulded to the shape of the pipeline inner surface to be lined.

The lining tube 12 as shown in FIG. 2 is in fact made up of two tubes, the outer 21 being a resin absorbent material such as a felt 22 and an outer membrane 24 in the form of a coating or film bonded to felt 22, and the inner being a felt tube 26. In use the felts 22, 26 are impregnated with a curable synthetic resin. The resin, either or with or without fillers, is selected so as to have a specific gravity approximating to that of the liquid used to invert the lining, so that the lining as it passes along the section 10 will have substantially neutral buoyancy and frictional forces between the lined portion of the section 10, and the section of the lining tube moving into that portion, are avoided. The lining tube is held position lining the pipeline section until the resin cures forming a rigid resin tube which is free standing in the tube section 10, and has the resin absorbent material embedded therein.

The outer tube 21 is formed from sheet form into tube form, and abutting edges are sewn together as shown at 25.

The line of sewing is covered by means of a cutting tape, of film, extrudate 27 or the like. The inner tube 26 is a sheet of felt wrapped to form a tube, and overlapping edges thereof are sewn together as indicated at 30. There may be more than one, or no, inner layer depending upon the thickness of lining required.

The resin absorbent felt material of the inner and outer layers is soaked in resin, and in the final lining, after curing of the resin, the inner and outer layers become integral with their felt materials embedded in the resin, to form the composite rigid lining pipe.

As can be appreciated from the structure of the lining tube as shown in FIG. 2, the tube prior to impregnation will contain a fairly large volume of air and the present invention ensures the effective and homogeneous impregnation of the felt material, utilising the barrier properties of the outer membrane 24.

Prior to the description of the impregnation of the felt material however, reference is made to FIGS. 3 to 7 to illustrate how a suitable and particularly advantageous end structure can be provided on a lining tube constructed as shown in FIG. 2.

Assuming that the felt material of the inner and outer layers of the tube shown in FIG. 2 is a polyester fibre, to form the novel end structure, the outer layer 21 is folded backwards as shown in FIG. 3, and shoulders 32 are cut in the inner layer 26, also shown in FIG. 3, thereby to define at the end of the inner layer two narrow tongues 34 and 36 and the shoulders 32, the inner layer 26 at one side of each shoulder being provided with a tab 40.

As shown in FIG. 4, in order to seal the sides of the inner layer together in the region of the cut portions, the tabs 40 are folded inwardly as shown and are flame bonded to the adjacent inner surface of the inner layer, and the opposing edges of the tongues 34, 36 are flame bonded together in order to form a vent tube 44 which is open at the end 46. As shown in FIG. 5 one of the cut away portions 42 (see FIG. 3) created in forming the shoulders 32 is cut to define a saddle having a central hole 48, and that saddle portion is slipped over the vent tube 44, so that portions of the saddle cover the shoulders and the saddle is in fact flame bonded to the outside of the inner layer 26 in the region of the shoulders, as shown in FIG. 6.

Next, as shown in FIG. 7, the outer layer 21 is folded once more to the original position, to cover the vent tube 44, and as also shown in FIG. 7 two similarly shaped blanks 50, 52 of impermeable film, such as polyurethane film are placed in register but overlapping the end portion of the outer layer 21. These blanks are secured together around their adjacent edges and to the coating of the outer layer 21 by means of suitable solvent, whereby as shown in FIG. 7, the end of the outer layer 21 is sealed, apart from a bleed outlet 54, which is in register with the vent tube 44 in the inner layer 26. FIG. 7 also shows how a pair of straps 56, which may be scrap cuttings of the coated material used for the outer layer 21, are bonded to the outer surface of the outer layer, to form a hold back means, whereby, by the use of ropes looped round said straps 56, the end of the lining tube may be restrained from everting too quickly into the passageway 10. FIG. 7 furthermore, shows how a resin injection nozzle 60 can pass through the bleed outlet 54 and the vent tube 44 to enable the injection of resin into the interior of the lining tube 12.

FIG. 8 shows how an initial air seal is formed at the end of the lining tube prior to the impregnation proper of the entire tube with resin. As shown in FIG. 8, a slug of resin 62 is introduced into the end of the tube constructed as shown in FIG. 7, through the bleed outlet 54 and vent tube 44. After introducing the slug of resin, the bleed outlet 54 is closed, and a vacuum is applied to the interior of the tube downstream of the slug of resin, that is to say at a point more towards the opposite end of the tube. This application of vacuum causes the tube to collapse in the region of the resin as shown in FIG. 9, and the flow of the resin into the felt material of the inner and outer layers at top and bottom of the tube, thereby to form an effective air seal.

Figure 11:
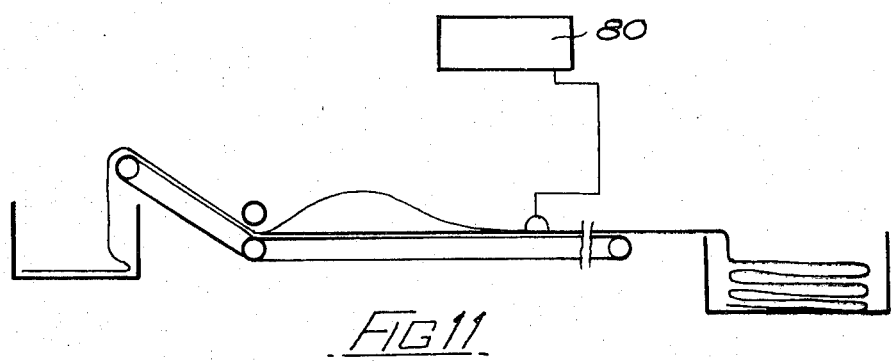

When the said seal has been effected, the total amount of resin required for the effective impregnation of the resin absorbent material of the entire tube (obtained by calculation), is injected into the end of the tube shown in FIG. 7 by means of the nozzle 60 illustrated. A large bubble of resin 64 therefore exists inside the tube for example as shown in FIG. 10. FIGS. 10 and 11 show how the tube is processed for the complete and effective impregnation of the resin absorbent material of all layers of the tube. The tube is shown as being supported on a conveyor comprising a horizontal section 66, and inclined section 68. an nip roller 70 is located in the region where the inclined section 68 meets the horizontal section 66, and the direction of movement of the tube on the conveyor is illustrated by arrows 72. The end of the tube into which the resin has been introduced is indicated by numeral 74 and it will be seen that in the position shown in FIG. 10, that end has only just been passed under the nip roller 64, and has started its travel up the inclined reach 70. The bulk of the lining is yet to be impregnated, and is contained in a skip 76. An empty skip 76 is located adjacent the top end of the inclined section 66 of the conveyor, to receive the impregnated tube as it is discharged from the upper end of the said inclined section 66.

A vacuum source 80 is provided, and a vacuum cup 82 is connected to the vacuum source by means of a flexible hose 84. The vacuum cap 82 is applied to the outside of the lining tube 12, downstream of the mass of resin 64 inside the tube 12, by a distance equal to the length over which the hose 84 can extend, the vacuum cup 82 being in register with a window 86 (see FIG. 11) made in the outer membrane 24 of the lining tube 12, so that the vacuum applied to the interior of the cup can be applied to the interior of the lining tube 12, whereby air is drawn from the inside of the tube 12 to permit the effective and efficient impregnation of the absorbent material with the resin. The membrane 24 of course acts as a barrier to inflow of air from the atmosphere, so that when the vacuum is applied, the tube collapses to a flat condition with the withdrawal of air, and the withdrawal of air enhances the inflow of the resin material into the interstices in the felt material, and therefore the effective and even impregnation of the resin absorbent material. The nip roller 70 also assists in this regard.

FIG. 11 shows the impregnation process at a midway position, and it should be mentioned that when one section of the impregnation of the tube 12 has been completed, the suction cup 84 is removed to a downstream location whereat a further window is formed, the previous window 86 having been sealed by means of a patch of a material compatible to the material of the coating, the patch being suitably sealingly bonded to the coating material. The vacuum cup 82 is therefore applied at intervals during the impregnation process, until complete impregnation of the resin absorbent material has been achieved.

Figure 12:
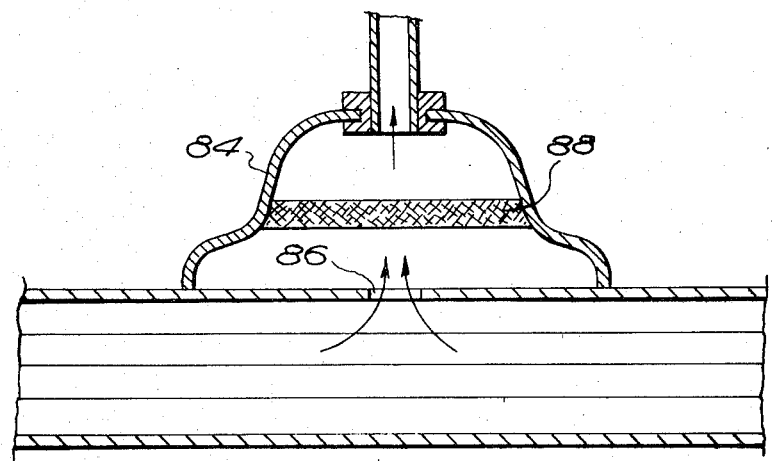

FIG. 12 shows a cross sectional view of the suction cup 84, and it will be seen to include a filter 88 for the prevention of sucking back foreign matter to the vacuum source 80.

The method of the invention provides an extremely simple and effective process for the impregnation of a tubular structure, including a resin absorbent material with resin, especially a tubular structure for the lining of pipelines and passageways. Also according to the invention, a novel end structure for such lining tubes is provided.

I claim:

1. A method of impregnating with a curable resin an inner layer of resin absorbent material disposed in an elongate flexible tube having an outer layer formed by an impremeable film, the method comprising the steps of (1) introducing into one end of the elongate tube a mass of the curable resin sufficient to impregnate the entire resin absorbent inner layer of the tube, (2) forming a window in the impermeable outer layer of the tube at a distance from said one end of the tube, (3) drawing through the window a vacuum in the interior of the tube downstream of said one end by disposing over the window a cup connected by a flexible hose to a vacuum source which cup prevents ingress of air into the interior of the tube while the tube is being evacuated, the outer layer of the tube being substantially impermeable to air, (4) beginning at or near the end at which the curable resin mass was introduced, passing the tube between squeezing members which force the resin to flow towards the region of vacuum application as the tube progresses through the squeezing members, (5) when the resin reaches the vicinity of the region of vacuum application, removing the cup and sealing the window, (6) providing another window in the impermeable layer of the tube downstream of the previously formed window, (7) drawing through the new window a vacuum in the interior of the tube while progressively moving the tube through the squeezing members to force the resin to flow toward the new region of vacuum application, and (8) repeating steps 5, 6, and 7, where necessary to impregnate the entire resin absorbent inner layer of the flexible tube.

2. The method according to claim 1, further including the step of forming an initial air seal at the end of the flexible tube at which the mass of resin was introduced by closing off that end of the tube after introduction of the mass of resin and before vacuum is applied to the interior of tube to draw the resin toward the region of vacuum application.

3. The method according to claim 1, wherein said outer layer of the flexible tube is defined by a felt sheet coated with a synthetic resinous material that forms said film, the method further including the steps of (i) sewing together adjacent edges of the felt sheet to form the tube, and (ii) covering the resultant seam with a sealing strip that is impervious to air.

* * * * *